(12) United States Patent
Wallner et al.

(10) Patent No.: US 6,220,625 B1
(45) Date of Patent: Apr. 24, 2001

(54) INFLATABLE SIDE CURTAIN

(75) Inventors: John P. Wallner, Rochester Hills; Ayad G. Nayef, Auburn Hills, both of MI (US)

(73) Assignee: TRW Vehicle Safety Systems Inc., Lyndhurst, OH (US)

( * ) Notice: Subject to any disclaimer, the term of this patent is extended or adjusted under 35 U.S.C. 154(b) by 0 days.

(21) Appl. No.: 09/476,524

(22) Filed: Jan. 3, 2000

(51) Int. Cl.$^7$ .................................................. B60R 21/22
(52) U.S. Cl. .................... 280/730.2; 280/729; 280/743.1; 280/749; 280/753
(58) Field of Search ............................... 280/730.2, 743.2, 280/743.1, 729, 730.1, 749, 751, 753

(56) References Cited

U.S. PATENT DOCUMENTS

| | | | |
|---|---|---|---|
| 4,300,894 | * 11/1981 | Cumming et al. | 280/729 |
| 5,788,270 | 8/1998 | Haland et al. | |
| 5,865,462 | 2/1999 | Robins et al. | |
| 5,884,937 | 3/1999 | Yamada | |
| 5,899,491 | 5/1999 | Tschauachke | |

FOREIGN PATENT DOCUMENTS

| | | |
|---|---|---|
| 19743626 | 4/1998 | (DE) . |
| 29903409 | 6/1999 | (DE) . |
| WO9626087 | 8/1996 | (WO) . |
| WO9807598 | 2/1998 | (WO) . |

\* cited by examiner

*Primary Examiner*—Eric Culbreth
(74) *Attorney, Agent, or Firm*—Tarolli, Sundheim, Covell, Tummino & Szabo L.L.P.

(57) ABSTRACT

Apparatus (10) for helping to protect an occupant of a vehicle (12) which has a side structure (16) and a roof (18) comprises an inflatable vehicle occupant protection device (14). The inflatable vehicle occupant protection device (14) is inflatable away from the vehicle roof (18) into a position between the side structure (16) of the vehicle (12) and a vehicle occupant. An inflation fluid source (24) provides inflation fluid for inflating the inflatable vehicle occupant protection device (14). The inflatable vehicle occupant protection device (14) comprises a pair of overlying panels (40, 42) having overlapping portions that are secured together at points of connection (60). First and second points of connection (70, 72) are spaced vertically apart from each other and positioned along a first straight line (74) that extends between the first and second points of connection. Third and fourth points of connection (80, 82) are spaced horizontally apart from each other and positioned along a second straight line (84) that extends between the third and fourth points of connection. The second straight line (84) extends transverse to the first straight line (74).

26 Claims, 6 Drawing Sheets

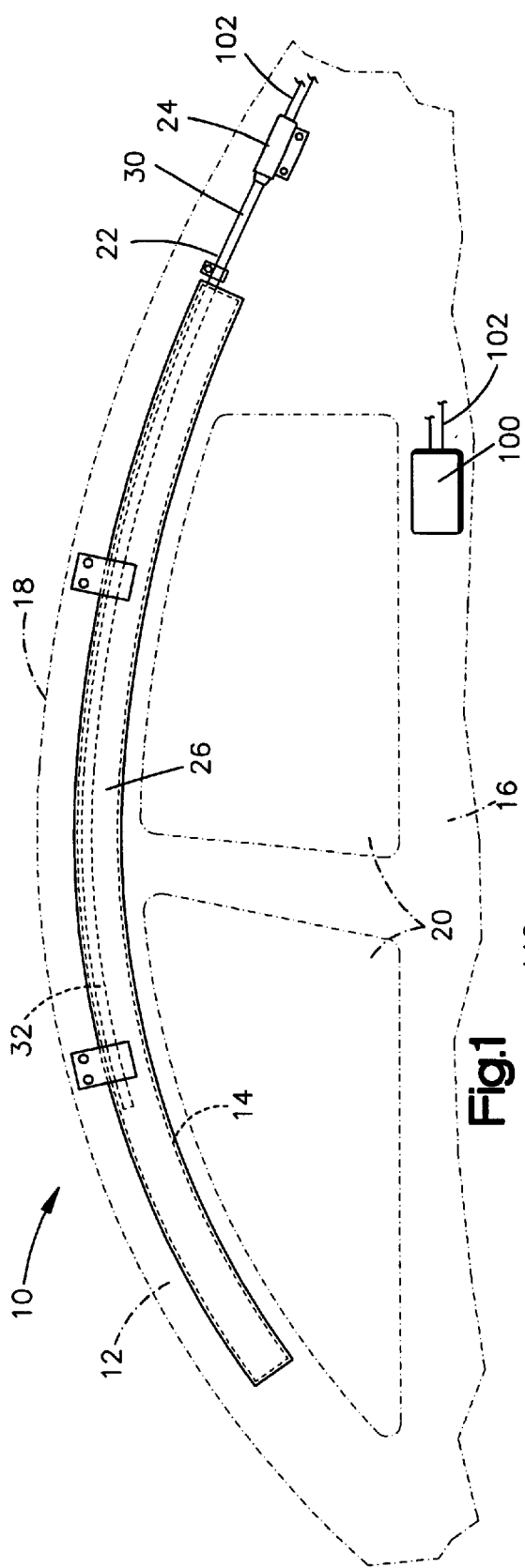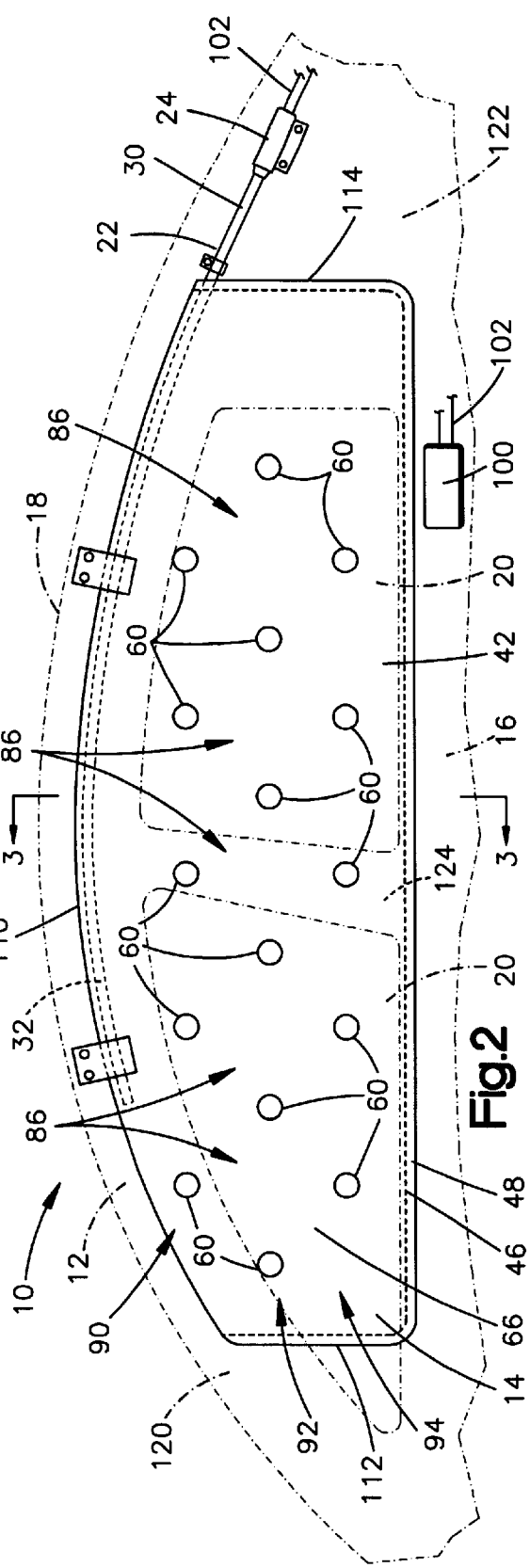

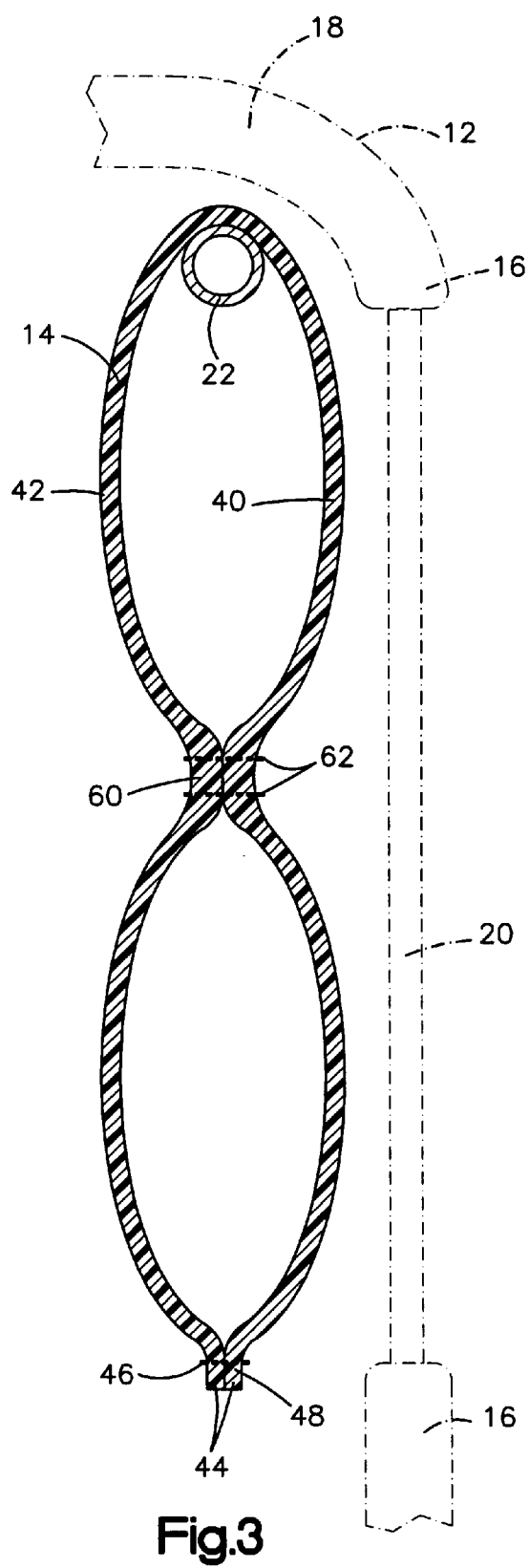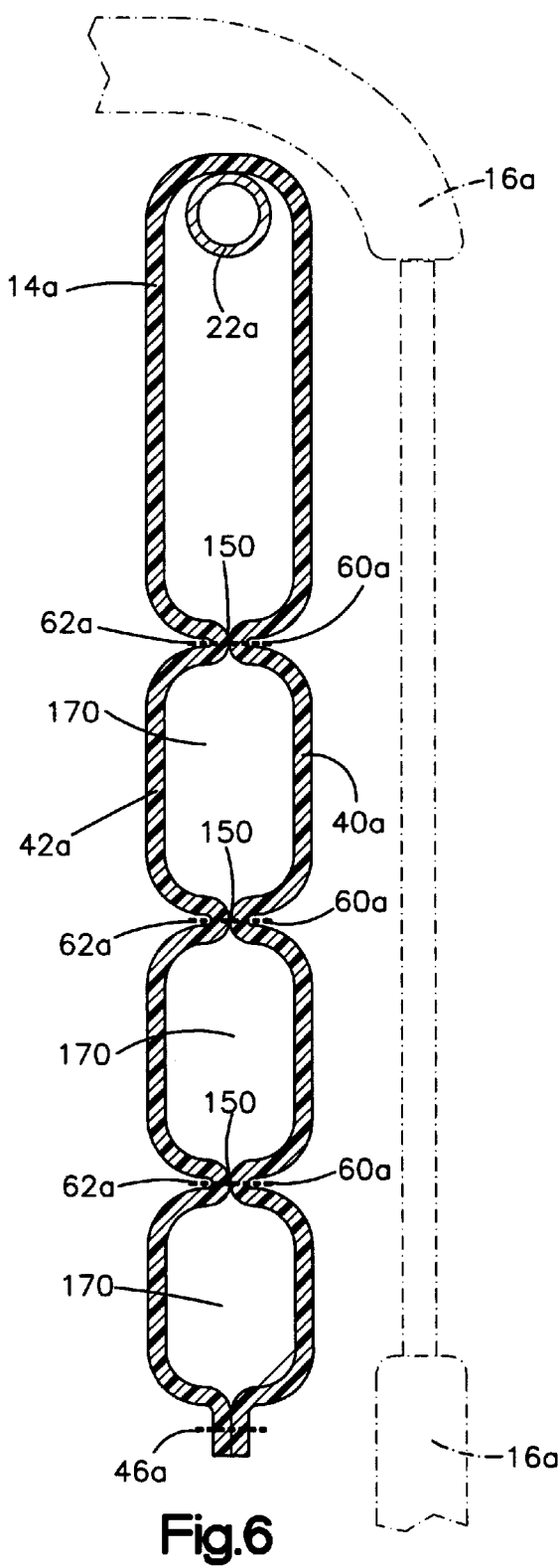

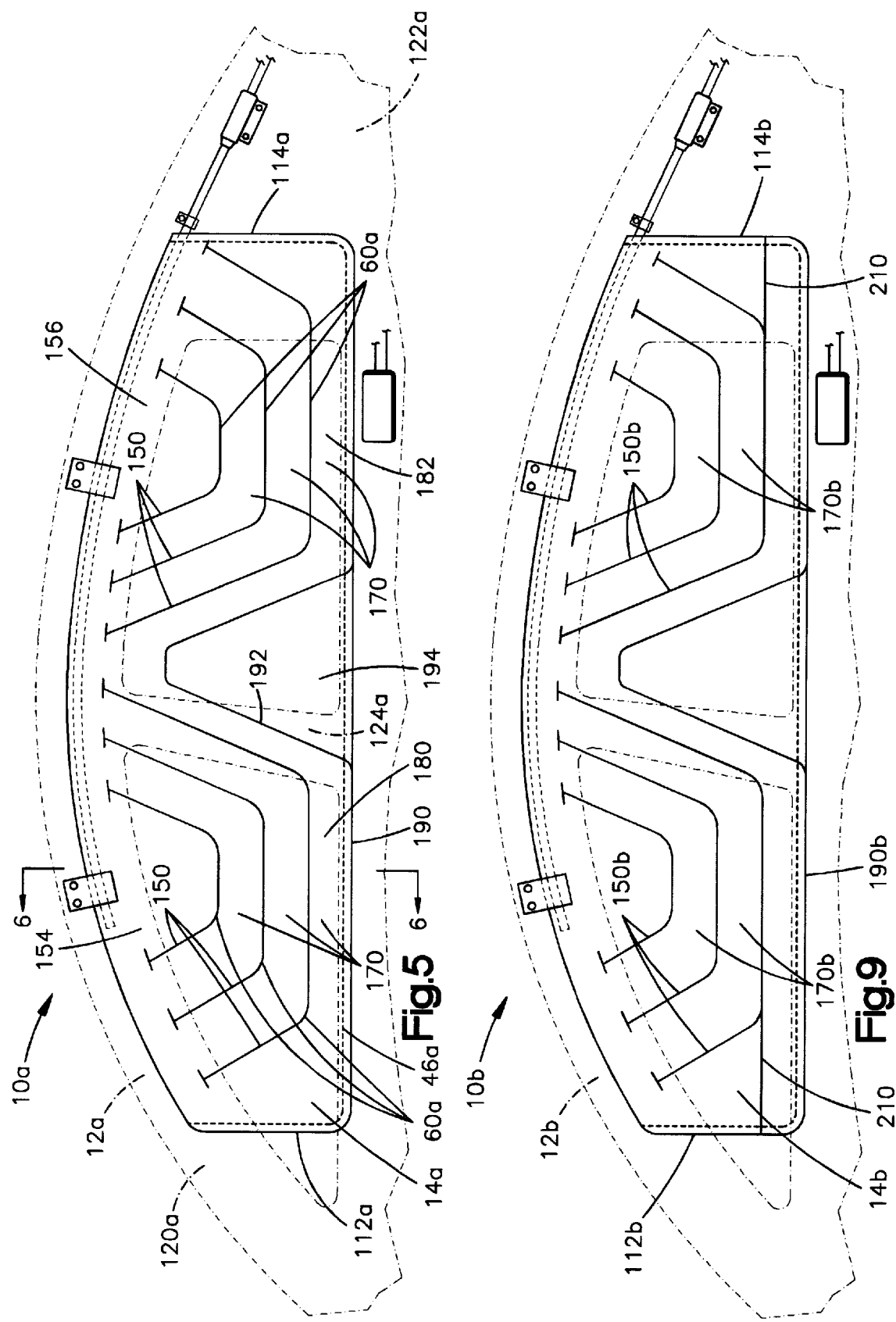

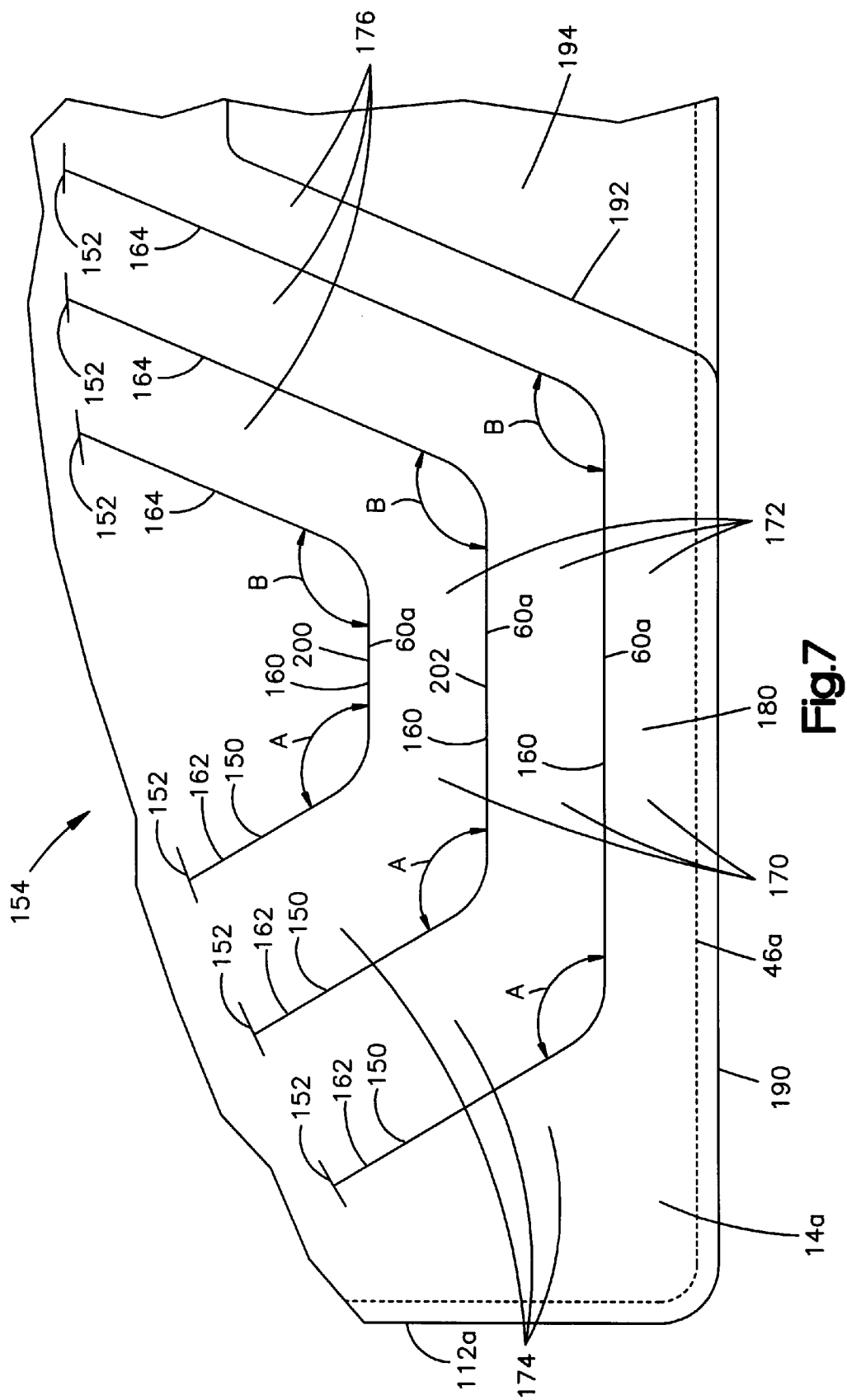

INFLATABLE SIDE CURTAIN

FIELD OF THE INVENTION

The present invention relates to an inflatable vehicle safety apparatus for helping to protect a vehicle occupant in the event of a side impact to a vehicle and/or a vehicle rollover.

BACKGROUND OF THE INVENTION

It is known to inflate an inflatable vehicle occupant protection device to help protect a vehicle occupant in the event of a vehicle collision. One particular type of inflatable vehicle occupant protection device is an inflatable curtain that inflates from the roof of the vehicle downward inside the passenger compartment between a vehicle occupant and the side structure of the vehicle in the event of a side impact or rollover. A known inflatable curtain is inflated from a deflated condition by inflation fluid directed from an inflator to the inflatable curtain through a fill tube.

SUMMARY OF THE INVENTION

The present invention relates to an apparatus for helping to protect an occupant of a vehicle that has a side structure and a roof. The apparatus includes an inflatable vehicle occupant protection device that is inflatable away from the vehicle roof into a position between the side structure of the vehicle and a vehicle occupant. An inflation fluid source provides inflation fluid for inflating the inflatable vehicle occupant protection device. The inflatable vehicle occupant protection device comprises a pair of overlying panels that have overlapping portions secured together at points of connection. First and second points of connection are spaced vertically apart from each other and positioned along a first straight line that extends between the first and second points of connection. Third and fourth points of connection are spaced horizontally apart from each other and positioned along a second straight line that extends between the third and fourth points of connection. The second straight line extends transverse to the first straight line.

The present invention also relates to an apparatus for helping to protect an occupant of a vehicle that has a side structure and a roof. The apparatus includes an inflatable vehicle occupant protection device that is inflatable away from the vehicle roof into a position between the side structure of the vehicle and a vehicle occupant. An inflation fluid source provides inflation fluid for inflating the inflatable vehicle occupant protection device. The inflatable vehicle occupant protection device comprises a plurality of generally U-shaped connections that define a plurality of generally U-shaped chambers of the inflatable vehicle occupant protection device. Each of the U-shaped chambers has a base portion and leg portions that project from opposite ends of the base portion.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIG. 1 is a schematic view of an inflatable vehicle safety apparatus illustrating the safety apparatus in a deflated condition, according to a first embodiment of the invention;

FIG. 2 is a schematic view of the vehicle safety apparatus of FIG. 1 in an inflated condition;

FIG. 3 is a sectional view of the vehicle safety apparatus taken generally along line 3—3 in FIG. 2;

FIG. 5 is a schematic view of a vehicle safety apparatus in an inflated condition, according to a second embodiment of the invention;

FIG. 6 is a sectional view of the vehicle safety apparatus taken generally along line 6—6 in FIG. 5;

FIG. 7 is an enlarged view of a portion of the vehicle safety apparatus of FIG. 5;

FIG. 9 is a schematic view of a vehicle safety apparatus in an inflated condition, according to a third embodiment of the invention.

DESCRIPTION OF PREFERRED EMBODIMENTS

Figure 4:
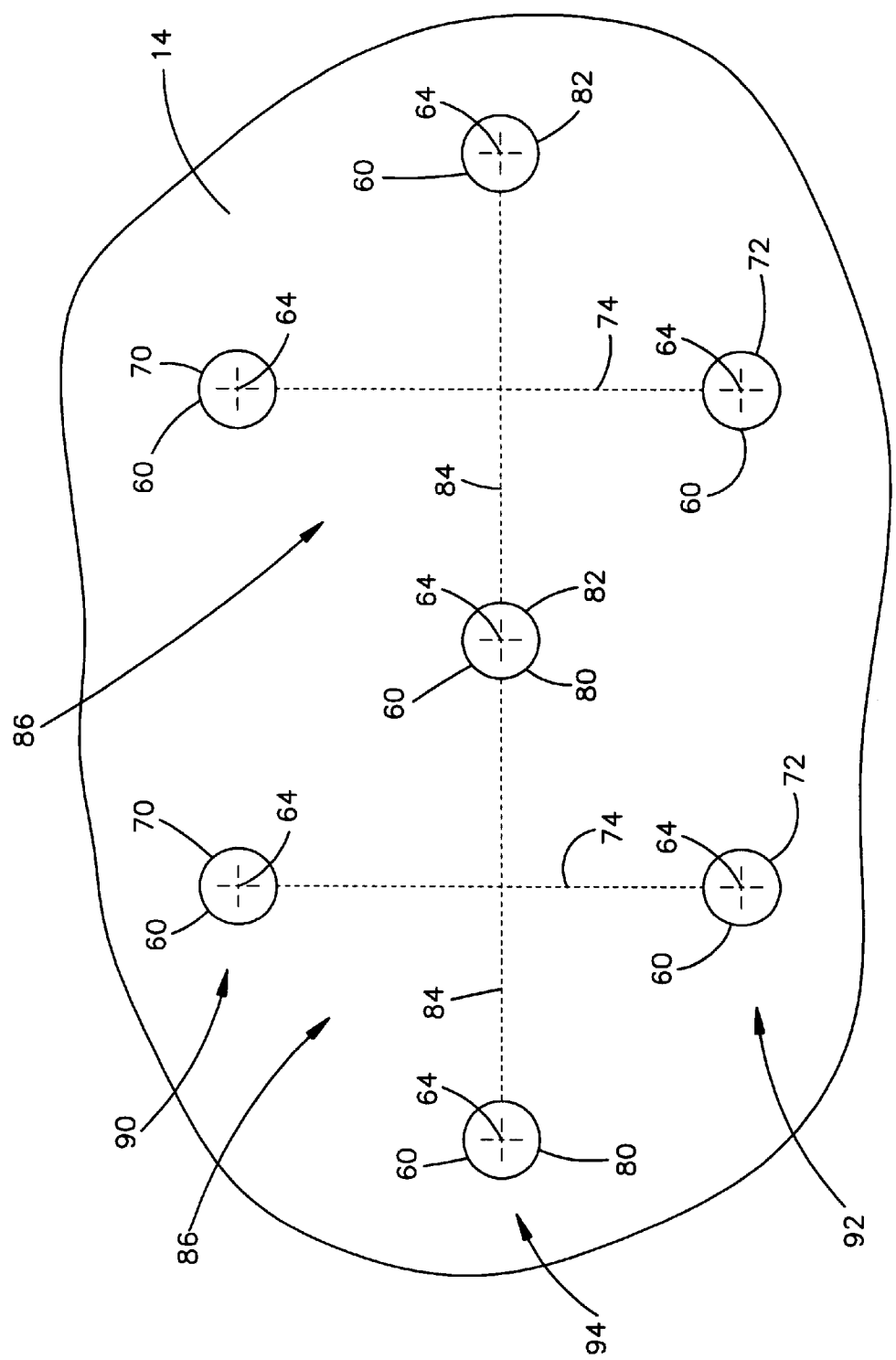
FIG. 4 is an enlarged view of a portion of the vehicle safety apparatus of FIG. 2.

As representative of the present invention, a vehicle safety apparatus 10 helps to protect an occupant of a vehicle 12. As shown in FIGS. 1 and 2, the safety apparatus 10 includes an inflatable vehicle occupant protection device in the form of an inflatable curtain 14 that is mounted adjacent to the side structure 16 of the vehicle 12 and a roof 18 of the vehicle. The side structure 16 of the vehicle 12 includes side windows 20. An inflator 24 is connected in fluid communication with the inflatable curtain 14 through a fill tube 22.

The fill tube 22 has a first end portion 30 for receiving fluid from the inflator 24. The fill tube 22 has a second end portion 32 disposed in the inflatable curtain 14. The second end portion 32 of the fill tube 22 has a plurality of openings (not shown) that provide fluid communication between the fill tube 22 and the inflatable curtain 14. It will be recognized by those skilled in the art that the fill tube 22 may be omitted and the inflator 24 may be connected in direct fluid communication with the inflatable curtain 14. In such a configuration, the inflator 24 would be connected to an end of the inflatable curtain 14 or to a location on the curtain between the ends of the curtain.

The inflator 24 contains a stored quantity of pressurized inflation fluid (not shown) in the form of a gas to inflate the inflatable curtain 14. The inflator 24 alternatively could contain a combination of pressurized inflation fluid and ignitable material for heating the inflation fluid, or could be a pyrotechnic inflator that uses the combustion of gas-generating material to generate inflation fluid. In fact, the inflator 22 could be of any suitable type or construction for supplying a medium for inflating the inflatable curtain 14.

The safety apparatus 10 includes a housing 26 (FIG. 1) that stores the inflatable curtain 14 in a deflated condition. The fill tube 22, the deflated inflatable curtain 14, and housing 26 have an elongated configuration and extend along the vehicle roof 18 and along the side structure 16 of the vehicle 12 above the side windows 20.

As best illustrated in FIG. 3, the inflatable curtain 14 comprises first and second panels 40 and 42 that are arranged in an overlying manner. Overlapping portions 44 of the first and second panels 40 and 42 are secured together by stitching 46 (FIGS. 2 and 3) that extends along the periphery 48 of the panels.

In the illustrated embodiment, the inflatable curtain 14 (FIG. 3) is formed from a sheet of material that is folded over to form the overlying first and second panels 40 and 42. It will be recognized by those skilled in the art, however, that the inflatable curtain 14 could have alternative constructions. For example, the first and second panels 40 and 42 could be formed from separate sheets of material arranged in an overlying manner and secured together by stitching 46 that extends around the entire periphery 48 of the panels to form the inflatable curtain 14. The first and second panels 40 and 42 may also be woven together along their peripheries to form the inflatable curtain 14.

The first and second panels 40 and 42 are constructed of a fabric, such as nylon, that is coated with a gas impermeable material such as urethane or silicone. The inflatable curtain 14 thus has a substantially air-tight construction. Other materials, such as elastomers, plastic films, or combinations thereof may also be used to construct the inflatable curtain 14. The first and second panels 40 and 42 may also be formed of single or multi-layered sheets of material.

The first and second panels 40 and 42 are connected together at a plurality of points of connection 60 by known means 62, such as stitching or weaving. Alternative means (not shown) such as dielectric sealing, ultrasonic bonding, heat sealing, and adhesives may also be used to form the points of connection 60. The first and second panels 40 and 42 may also be connected together at the points of connection 60 by tethers that correspond to the shape and pattern of the points of connection and are sewn or otherwise secured to the panels 40 and 42 to interconnect the panels.

In the illustrated embodiment, the points of connection 60 (FIG. 2) are circular portions of the inflatable curtain 14 where overlapping portions of the first and second panels 40 and 42 are secured together. An inflatable chamber portion 66 of the inflatable curtain 14 surrounds the points of connection 60. Each of the points of connection 60 (FIG. 4) defines a non-inflatable circular area having a center 64. The diameter of the circular area may be increased or decreased to achieve a desired size of the points of connection 60. The points of connection 60 may also have an alternative shape, such as a rectangular shape.

The inflatable curtain 14 is configured such that the points of connection 60 are arranged in a predetermined pattern. As illustrated in FIG. 4, the inflatable curtain 14 includes first and second points of connection 70 and 72, respectively, that are spaced vertically apart from each other. The first and second points of connection 70 and 72 are positioned along a first straight line 74 that extends between the centers 64 of the first and second points of connection. The inflatable curtain 14 also includes third and fourth points of connection 80 and 82, respectively, that are spaced horizontally apart from each other. The third and fourth points of connection 80 and 82 are positioned along a second straight line 84 that extends between the centers 64 of the third and fourth points of connection.

The second straight line 84 extends transverse to the first straight line 74 and has a length equal to the first straight line. The second straight line 84 preferably extends perpendicular to the first straight line 74. Also, the first and second straight lines 74 and 84 preferably bisect each other. The points of connection 60 are thus arranged in groups of connections 86 that have a generally diamond-shaped pattern. In FIG. 4, two such diamond-shaped groups of connections 86 are illustrated.

The inflatable curtain 14 includes a plurality of first points of connection 70 that are spaced along a first horizontal row 90. A plurality of second points of connection 72 are spaced along a second horizontal row 92. A plurality of third and fourth points of connection 80 and 82 are spaced along a third horizontal row 94 that is positioned between the first and second horizontal rows 90 and 92. The first, second, and third horizontal rows 90, 92, and 94 (FIGS. 2 and 4) form a plurality of groups of connections 86 that are positioned horizontally adjacent to each other on the inflatable curtain 14. The arrangement of the points of connection 60 is such that the fourth point of connection 82 (FIG. 4) of one group of connections 86 is also the third point of connection 80 of an adjacent group of connections 86. This is the case with the point of connection 60 in the center of FIG. 4.

The vehicle 12 includes a sensor mechanism 100 (shown schematically in FIGS. 1 and 2) for sensing a side impact to the vehicle 12 and/or a rollover of the vehicle 12. The sensor mechanism 100 actuates the inflator 24 in response to the sensing of a side impact or a vehicle rollover.

In the event of a rollover of the vehicle or a side impact to the vehicle 12 of a magnitude greater than a predetermined threshold value, the sensor mechanism 100 provides an electrical signal over lead wires 102 to the inflator 24. The electrical signal causes the inflator 24 to be actuated in a known manner. The inflator 24 discharges fluid under pressure into the fill tube 22. The fill tube 22 directs the fluid into the inflatable curtain 14.

The inflatable curtain 14 inflates under the pressure of the inflation fluid from the inflator 24. The housing 26 (FIG. 1) opens and the inflatable curtain 14 (FIG. 2) inflates away from the roof 18 in a downward direction as shown in the drawings and in a downward direction with respect to the direction of forward travel of the vehicle 12 into the position illustrated in FIG. 2.

The inflatable curtain 14, when inflated, extends along the side structure 16 of the vehicle 12 and is positioned between the side structure and any occupant of the vehicle. When the inflatable curtain 14 is in the inflated condition, the first panel 40 is positioned adjacent to the side structure 16 of the vehicle 12. A top edge 110 of the inflatable curtain 14 is positioned adjacent to the intersection of the roof 18 and the side structure 16 of the vehicle 12. A front edge 112 of the inflatable curtain 14 is positioned adjacent to an A pillar 120 of the vehicle 12. A rear edge 114 of the inflatable curtain 14 is positioned adjacent to a C pillar 122 of the vehicle 12. The inflatable curtain 14 extends between the A pillar 120 and the C pillar 122 of the vehicle 12 and overlies at least a portion of the A pillar, the C pillar, and a B pillar 124 of the vehicle.

It will be recognized by those skilled in the art, however, that the inflatable curtain may have alternative configurations. For example, in the illustrated embodiment, the inflatable curtain 14 extends between the A pillar 120 and the C pillar 122 of the vehicle 12. The inflatable curtain 14 could, however, extend between the A pillar 120 and the B pillar 124 only or between the B pillar and the C pillar 122 only. Also, in a vehicle having A, B, C, and D pillars (not shown), the inflatable curtain 14 could, when inflated, extend between the A pillar and the D pillar.

The inflatable curtain 14, when inflated, helps to protect a vehicle occupant in the event of a vehicle rollover or a side impact to the vehicle 12. The points of connection 60 help to limit the thickness of the inflated inflatable curtain 14 and help to reduce the overall volume of the curtain. The quantity and pattern of the points of connection 60 help to reduce the load concentration on the points of connection during inflation of the inflatable curtain 14 and during impacts with the inflatable curtain. The chamber portion 66 of the inflatable curtain 14 helps to absorb the energy of impacts with the inflatable curtain 14 and helps to distribute the impact energy over a large area of the curtain.

A second embodiment of the present invention is illustrated in FIGS. 5–8. The second embodiment of the invention is similar to the first embodiment of the invention illustrated in FIGS. 1–4. Accordingly, numerals similar to those of FIGS. 1–4 will be utilized in FIGS. 5–8 to identify similar components, the suffix letter "a" being associated with the numerals of FIGS. 5–8 to avoid confusion. The apparatus 10a (FIGS. 5–8) of the second embodiment is identical to the apparatus 10 (FIGS. 1–4), except that the points of connection 60a (FIGS. 5–8) on the inflatable curtain 14a have a different shape and pattern than the points of connection 60 (FIGS. 1–4) on the inflatable curtain 14.

In the embodiment illustrated in FIGS. 5–8, the inflatable curtain 14a includes a plurality of points of connection 60a in the form of generally U-shaped connections 150. The panels 40a and 42a (FIG. 6) are connected together at the U-shaped connections 150 by known means 62a, such as stitching or weaving. The panels 40a and 42a may also be connected together at the U-shaped connections 150 by tethers that correspond to the shape and pattern of the U-shaped connections and are sewn or otherwise secured to the panels to interconnect the panels.

Figure 8:
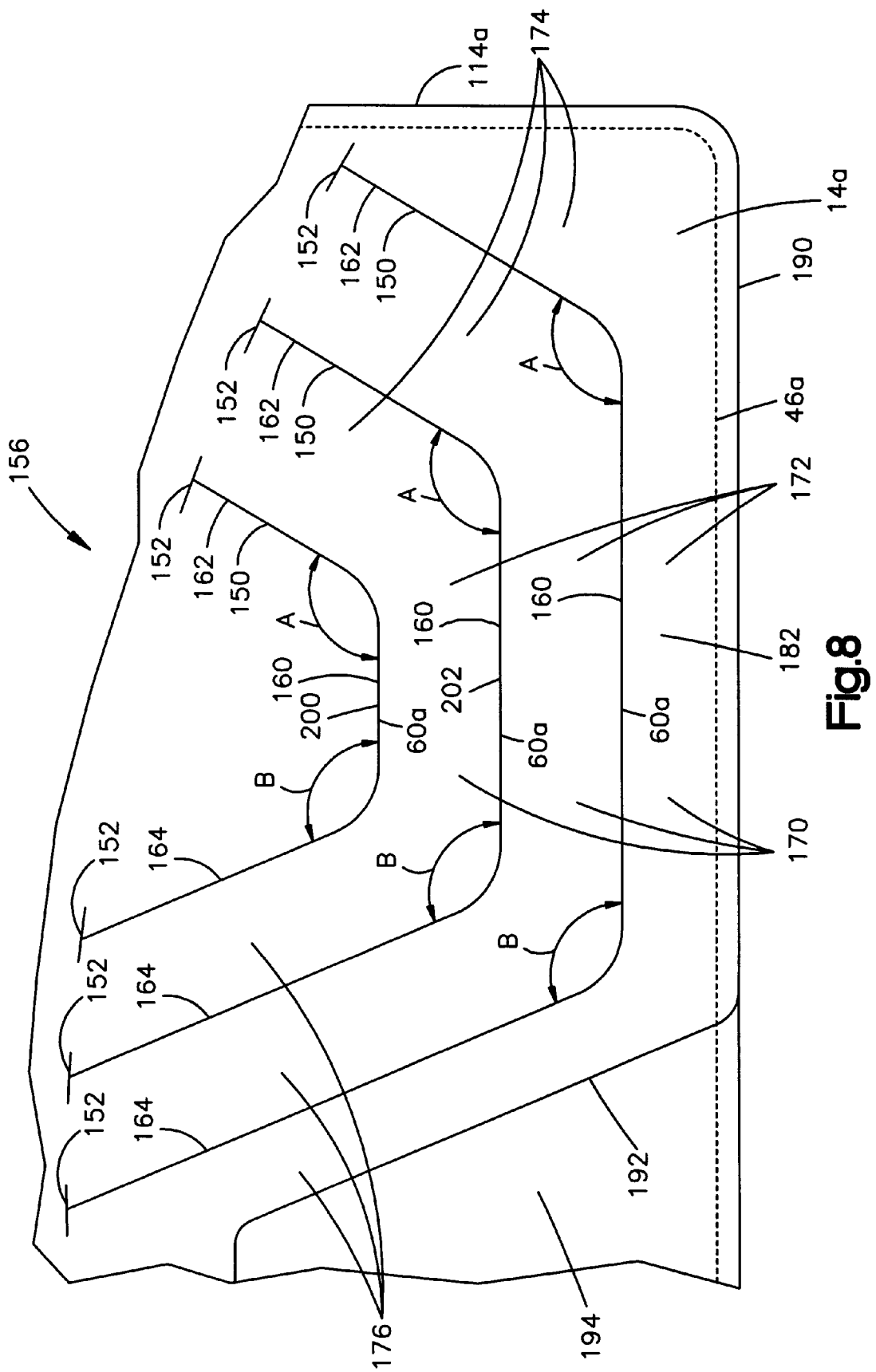
FIG. 8 is an enlarged view of a portion of the vehicle safety apparatus of FIG. 5.

As illustrated in FIG. 5, there are three U-shaped connections 150 located in a front portion 154 of the inflatable curtain 14a and three U-shaped connections 150 located in a rear portion 156 of the curtain. FIGS. 7 and 8 illustrate the front and rear portions 154 and 156, respectively, of the inflatable curtain 14a in detail.

As illustrated in FIGS. 7 and 8, each of the U-shaped connections 150 has a base portion 160 and leg portions 162 and 164 that extend from opposite ends of the base portion. The U-shaped connections 150 may also include reinforcing segments 152 at the ends of the U-shaped connections. The base portions 160 are linear, parallel, and extend in a generally horizontal direction. The leg portions 162 are linear, parallel, and extend at a first angle A from the base portion 160. The leg portions 164 are linear, parallel, and extend at a second angle B from the base portion 160. The first and second angles A and B may be acute, obtuse or right angles. The first and second angles A and B may also be equal.

The U-shaped connections 150 (FIGS. 5–8) define a plurality of generally U-shaped chambers 170. Each of the U-shaped chambers 170 (FIGS. 7 and 8) includes a linearly extending base portion 172 and linearly extending leg portions 174 and 176 that project from opposite ends of the base portion 172. The base portions 172 of the U-shaped chambers 170 are at least partially defined by the base portions 160 of the U-shaped connections 150. The base portions 172 are linear, parallel, and extend in a generally horizontal direction. The leg portions 174 of the U-shaped chambers 170 are at least partially defined by the leg portions 162 of the U-shaped connections 150. The leg portions 174 of the U-shaped chambers 170 are linear, parallel, and extend at the first angle A from the base portion 172. The leg portions 176 of the U-shaped chambers are at least partially defined by the leg portions 164 of the U-shaped connections 150. The leg portions 176 of the U-shaped chambers 170 are linear, parallel, and extend at the second angle B from the base portion 172.

Each of the U-shaped chambers 170 includes an upper side wall and a lower side wall. The inflatable curtain 14a includes two U-shaped bottom chambers 180 and 182 (FIG. 5) that are at least partially defined by the stitching 46a adjacent the edge portions of the curtain. The lower side wall of the bottom chamber 180 (FIG. 7) is defined by the stitching 46a adjacent the front edge 112a of the inflatable curtain 14a, the stitching 46a adjacent a bottom edge 190 of the curtain, and an inverted U-shaped central seam 192 of the curtain. The central seam 192 also defines a non-inflatable portion 194 of the inflatable curtain 14a. The lower side wall of the bottom chamber 182 (FIG. 8) is defined by the stitching 46a adjacent the rear edge 114a of the inflatable curtain 14a, the stitching 46a adjacent the bottom edge 190 of the curtain, and the central seam 192.

The U-shaped chambers 170 (FIGS. 7 and 8) have a nested configuration in which the U-shaped chambers are positioned vertically adjacent to each other. As a result, the lower side wall of one of the U-shaped chambers 170 may form the upper side wall of an adjacent U-shaped chamber. For example, the uppermost U-shaped chambers 170, when inflated, each have an upper side wall 200 and a lower side wall 202. The lower side walls 202 of the uppermost chambers 170 are the upper side walls 200 of the U-shaped chambers 170 immediately adjacent to the uppermost chambers.

As illustrated in FIG. 5, the inflatable curtain 14a includes two groups of nested U-shaped chambers 170. The number of groups of nested U-shaped chambers 170 could vary, however, depending upon the length of the inflatable curtain 14a along the side structure 16a of the vehicle 12a. For example, if the inflatable curtain 14a extended only between the A pillar 120a and B pillar 124a of the vehicle 12a, only one group of nested U-shaped chambers 170 may be incorporated in the curtain. However, if the inflatable curtain 14a extends between the A pillar 120a and the C pillar 122a or a D pillar (not shown), two or more groups of nested U-shaped chambers 170 may be incorporated in the curtain.

The inflatable curtain 14a, when inflated, helps to protect a vehicle occupant in the event of a vehicle rollover or a side impact to the vehicle 12a. The U-shaped connections 150 help to limit the thickness of the inflated inflatable curtain 14a and help to reduce the overall volume of the curtain. The reinforcing segments 152 help to prevent the panels 40a and 42a from becoming separated at the ends of the U-shaped connections 150 upon inflation of the curtain or impacts with the curtain. The U-shaped chambers 170, when inflated, help to absorb the energy of impacts with the inflatable curtain 14a and help to distribute the impact energy over a large area of the curtain.

A third embodiment of the present invention is illustrated in FIG. 9. The third embodiment of the invention is similar to the second embodiment of the invention illustrated in FIGS. 5–8. Accordingly, numerals similar to those of FIGS. 5–8 will be utilized in FIG. 9 to identify similar components, the suffix letter "b" being associated with the numerals of FIG. 9 to avoid confusion. The apparatus 10b (FIG. 9) of the third embodiment is identical to the apparatus 10a (FIGS. 5–8), except that the inflatable curtain 14b of the third embodiment (FIG. 9) does not include U-shaped chambers that are at least partially defined by stitching adjacent edge portions of the curtain.

In the embodiment illustrated in FIG. 9, the inflatable curtain 14b includes connections 210 that extend from edges of the curtain to adjacent U-shaped connections 150b of the curtain. One of the connections 210 extends from the front edge 112b of the inflatable curtain 14b to the U-shaped connection 150b closest to the front edge 112b of the curtain. Another connection 210 extends from the rear edge 114b of the inflatable curtain 14b to the U-shaped connection 150b closest to the rear edge 114b of the curtain. The U-shaped chambers 170b are thus spaced away from the front edge 112b, the rear edge 114b, and the bottom edge 190b of the inflatable curtain 14b.

From the above description of the invention, those skilled in the art will perceive improvements, changes and modifications. Such improvements, changes and modifications within the skill of the art are intended to be covered by the appended claims.

Having described the invention, the following is claimed:

1. Apparatus for helping to protect an occupant of a vehicle that has a side structure and a roof, said apparatus comprising:

an inflatable vehicle occupant protection device that is inflatable away from the vehicle roof into a position between the side structure of the vehicle and a vehicle occupant; and an inflation fluid source that provides inflation fluid for inflating said inflatable vehicle occupant protection device;

said inflatable vehicle occupant protection device comprising a pair of overlying panels having overlapping portions that are secured together at points of connection;

said inflatable vehicle occupant protection device including first and second points of connection spaced vertically apart from each other and positioned along a first straight line that extends between said first and second points of connection, said inflatable vehicle occupant protection device being free from points of connection that lie along said first straight line between said first and second points of connection;

said inflatable vehicle occupant protection device including third and fourth points of connection spaced horizontally apart from each other and positioned along a second straight line that extends between said third and fourth points of connection, said inflatable vehicle occupant protection device being free from points of connection that lie along said second straight line between said third and fourth points of connection, said second straight line extending transverse to said first straight line, said first and second straight lines intersecting at a location between said first and second points of connection and between said third and fourth points of connection.

2. Apparatus as defined in claim 1, wherein said first straight line extends perpendicular to said second straight line.

3. Apparatus as defined in claim 1, wherein said first straight line bisects said second straight line.

4. Apparatus as defined in claim 1, wherein said second straight line bisects said first straight line.

5. Apparatus as defined in claim 1, wherein said inflatable curtain further comprises:

a plurality of said first points of connection spaced along a first horizontal row;

a plurality of said second points of connection spaced along a second horizontal row; and a plurality of said third and fourth points of connection spaced along a third horizontal row, said third horizontal row being positioned between said first and second horizontal rows.

6. Apparatus as defined in claim 1, wherein said points of connection comprise overlapping circular portions of said first and second overlying panels, each of said points of connection defining a non-inflatable circular portion of said inflatable vehicle occupant protection device, each of said points of connection having a center.

7. Apparatus as defined in claim 6, wherein said first straight line extends between the centers of said first and second points of connection and said second straight line extends between the centers of said third and fourth points of connection.

8. Apparatus as defined in claim 1, wherein said inflatable vehicle occupant protection device is an inflatable curtain having a stored position extending along the side structure adjacent to a roof of the vehicle, said inflatable curtain being inflated away from the vehicle roof into said position between the side structure of the vehicle and a vehicle occupant.

9. Apparatus as defined in claim 8, further including a fill tube having a portion located in said inflatable curtain, said inflation fluid source being in fluid communication with said fill tube, said inflation fluid source, when actuated, providing inflation fluid to said fill tube, said fill tube directing said inflation fluid into said inflatable curtain to inflate said inflatable curtain.

10. Apparatus as defined in claim 8, wherein said inflatable curtain when inflated extends along the side structure of the vehicle between an A pillar and a C pillar of the vehicle.

11. Apparatus as defined in claim 8, wherein said inflatable curtain, when inflated, overlies at least a portion of an A pillar, a B pillar and a C pillar of the vehicle.

12. Apparatus as defined in claim 1, further comprising a sensor for sensing a vehicle condition for which deployment of said inflatable curtain is desired, said sensor actuating said inflation fluid source to provide inflation fluid to inflate said inflatable vehicle occupant protection device.

13. Apparatus as defined in claim 1, wherein said inflation fluid source comprises an inflator which is actuatable to inflate said inflatable vehicle occupant protection device.

14. Apparatus for helping to protect an occupant of a vehicle that has a side structure and a roof, said apparatus comprising:

an inflatable vehicle occupant protection device that is inflatable away from the vehicle roof into a position between the side structure of the vehicle and a vehicle occupant; and an inflation fluid source that provides inflation fluid for inflating said inflatable vehicle occupant protection device;

said inflatable vehicle occupant protection device comprising a plurality of generally U-shaped connections that define a plurality of generally U-shaped chambers of the inflatable vehicle occupant protection device, each of said U-shaped chambers having a linearly extending base portion and linearly extending leg portions that project from opposite ends of said base portion.

15. Apparatus as defined in claim 14, wherein each of said U-shaped chambers comprises a U-shaped lower side wall defined by one of said U-shaped connections and a U-shaped upper side wall defined by another of said U-shaped connections.

16. Apparatus as defined in claim 14, wherein said U-shaped chambers are vertically positioned adjacent to each other, the lower side wall of one of said U-shaped chambers forming the upper side wall of an adjacent U-shaped chamber.

17. Apparatus as defined in claim 14, wherein said U-shaped chambers have a nested configuration.

18. Apparatus as defined in claim 14, wherein at least one of said U-shaped chambers is defined at least partially by edge portions of said inflatable vehicle occupant protection device.

19. Apparatus as defined in claim 14, wherein said U-shaped chambers are spaced away from a front edge, a rear edge and a bottom edge of said inflatable vehicle occupant protection device.

20. Apparatus as defined in claim 14, wherein said inflatable vehicle occupant protection device further comprises a pair of overlying panels, said connections comprising U-shaped seams that secure said panels together.

21. Apparatus as defined in claim 14, wherein said inflatable vehicle occupant protection device is an inflatable curtain having a stored position extending along the side structure adjacent to a roof of the vehicle, said inflatable curtain being inflated away from the vehicle roof into said position between the side structure of the vehicle and a vehicle occupant.

22. Apparatus as defined in claim 21, further including a fill tube having a portion located in said inflatable curtain, said inflation fluid source being in fluid communication with said fill tube, said inflation fluid source, when actuated, providing inflation fluid to said fill tube, said fill tube directing said inflation fluid into said inflatable curtain to inflate said inflatable curtain.

23. Apparatus as defined in claim 21, wherein said inflatable curtain when inflated extends along the side structure of the vehicle between an A pillar and a C pillar of the vehicle.

24. Apparatus as defined in claim 21, wherein said inflatable curtain, when inflated, overlies at least a portion of an A pillar, a B pillar and a C pillar of the vehicle.

25. Apparatus as defined in claim 14, further comprising a sensor for sensing a vehicle condition for which deployment of said inflatable curtain is desired, said sensor actuating said inflation fluid source to provide inflation fluid to inflate said inflatable vehicle occupant protection device.

26. Apparatus as defined in claim 14, wherein said inflation fluid source comprises an inflator which is actuatable to inflate said inflatable vehicle occupant protection device.

* * * * *